United States Patent
Denning et al.

(10) Patent No.: US 10,672,077 B2
(45) Date of Patent: Jun. 2, 2020

(54) SYSTEM AND METHOD FOR PROACTIVE UNDERWRITING USING SOCIAL DATA

(71) Applicant: HARTFORD FIRE INSURANCE COMPANY, Hartford, CT (US)

(72) Inventors: Ryan Owen Denning, West Hartford, CT (US); Mushter Munib Moin, Newington, CT (US); Deborah L. Perschy, Southington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 462 days.

(21) Appl. No.: 13/918,335

(22) Filed: Jun. 14, 2013

(65) Prior Publication Data
US 2013/0339065 A1 Dec. 19, 2013

Related U.S. Application Data

(60) Provisional application No. 61/659,749, filed on Jun. 14, 2012.

(51) Int. Cl.
| | |
|---|---|
| *G06Q 40/08* | (2012.01) |
| *H04L 12/58* | (2006.01) |
| *H04W 4/021* | (2018.01) |
| *G06Q 50/00* | (2012.01) |
| *G06Q 50/04* | (2012.01) |

(52) U.S. Cl.
CPC .............. *G06Q 40/08* (2013.01); *G06Q 50/01* (2013.01); *H04L 51/32* (2013.01); *H04W 4/021* (2013.01)

(58) Field of Classification Search
CPC ........ G06Q 40/06; G06Q 50/01; G06Q 40/08; H04L 51/32; H04W 4/021

USPC ................................. 705/4; 709/204; 706/45
See application file for complete search history.

(56) References Cited

U.S. PATENT DOCUMENTS

| | | | | |
|---|---|---|---|---|
| 8,341,101 | B1 * | 12/2012 | Treiser ................... | G06Q 30/02 706/45 |
| 8,676,612 | B2 * | 3/2014 | Helitzer ................. | G06Q 40/08 705/4 |
| 2010/0100398 | A1 | 4/2010 | Auker et al. | |

(Continued)

OTHER PUBLICATIONS

Dietrich Chen, "Creating a Social Media Agenda for Healthcare", Dec. 15, 2011, www.ttec.com (Year: 2011).*

*Primary Examiner* — Ryan D Donlon
*Assistant Examiner* — Irene S Kang
(74) *Attorney, Agent, or Firm* — Howard IP Law Group, PC (57) ABSTRACT

Pursuant to some embodiments, systems, methods, apparatus and computer program code for proactive underwriting are provided. Pursuant to some embodiments, a computer implemented processing method is provided which includes identifying, by an insurance processing platform, an action by an entity that matches at least a first trigger rule. A proactive underwriting template is selected based on the at least first trigger rule, where the proactive underwriting template defines a number of data items required to complete the proactive underwriting template. The insurance processing platform is operated to automatically collect data associated with the plurality of required data items, and to perform a proactive underwriting analysis using the collected data. An underwriting determination is then rendered based on the proactive underwriting analysis.

17 Claims, 6 Drawing Sheets

(56) References Cited

U.S. PATENT DOCUMENTS

| | | |
|---|---|---|
| 2011/0040582 A1 | 2/2011 | Mullins |
| 2012/0101852 A1* | 4/2012 | Albert .................... G06Q 40/08 |
| | | 705/4 |
| 2012/0221357 A1 | 8/2012 | Krause et al. |
| 2012/0245963 A1* | 9/2012 | Peak et al. ........................ 705/4 |
| 2012/0272160 A1* | 10/2012 | Spivack ................ G06Q 10/10 |
| | | 715/752 |
| 2012/0290329 A1 | 11/2012 | Ross |
| 2013/0151589 A1 | 6/2013 | Eden |
| 2013/0325517 A1* | 12/2013 | Berg ..................... G06Q 10/10 |
| | | 705/4 |

* cited by examiner

SYSTEM AND METHOD FOR PROACTIVE UNDERWRITING USING SOCIAL DATA

CROSS REFERENCE TO RELATED APPLICATIONS

This application is based on, and claims benefit of and priority to U.S. Provisional Patent Application Ser. No. 61/659,749 filed on Jun. 14, 2012, the contents of which is hereby incorporated herein by reference in its entirety for all purposes.

BACKGROUND

Advances in computing and data processing have led to the creation of large sets of data about consumers and businesses. The data includes information from a wide variety of sources, including postal data, census and demographic data, and increasingly, data accumulated via user interaction with social media and other Websites such as Facebook®, Twitter®, Internet forums, question and answer sites (such as StackExchange®), photo sharing sites, and the like.

Frequently, this interaction data can be matched to a specific individual or business. Advertisers currently use some data to target advertising to individuals based on their interests. For example, Google® provides tools for advertisers to place keyword and demographically-targeted ads on Web pages which are considered to be relevant to consumers based on their search terms and based on their location and other demographic information.

While these targeted advertisements can serve the purpose of providing a relevant and targeted ad or offer to an interested consumer or business, they are unable to provide proactive offers of insurance that are presented based on some form of underwriting or underwriting analysis. It would be desirable to provide systems and methods that allow the proactive underwriting and presentation of insurance offers to prospective insureds based on the use of social and other data sources.

DETAILED DESCRIPTION

Pursuant to some embodiments, systems, methods, apparatus and computer program code for proactive underwriting are provided. Pursuant to some embodiments, a computer implemented processing method is provided which includes identifying, by an insurance processing platform, an action by an entity that matches at least a first trigger rule. A proactive underwriting template is selected based on the at least first trigger rule, where the proactive underwriting template defines a number of data items required to complete the proactive underwriting template. The insurance processing platform is operated to automatically collect data associated with the plurality of required data items, and to perform a proactive underwriting analysis using the collected data. An underwriting determination is then rendered based on the proactive underwriting analysis.

As used herein, the term "proactive underwriting" refers to the underwriting, evaluation, rating, offering, quoting and/or pricing of insurance for one or more entities without necessarily requiring a specific request or application from those entities. For example, as will be described further herein, a restaurant may be proactively presented with an offer of a small commercial insurance policy based on information obtained about the restaurant using techniques described herein. The offer may be unsolicited or requested by the restaurant. In some embodiments, the term "proactive underwriting" further encompasses the underwriting, evaluation, rating, offering, pricing or otherwise evaluating insurance for one or more entities in response to a request or inquiry such that some aspect or portion of the insurance is proactively provided using features of the present invention. For example, a restaurant may submit a request for a small commercial lines insurance policy, and the proactive underwriting system of the present invention may proactively obtain one or more items of information associated with the application (e.g., such that the restaurant need not provide all of the information needed to underwrite or price the policy—some of the information may be gathered or obtained using the system of the present invention).

Pursuant to some embodiments, a "template" specifying the types of data needed for the proactive underwriting of a policy or offer of insurance may be defined by the insurance company. For example, each form of insurance implemented using the present invention may have one or more "templates" that define the specific items of data needed for the proactive underwriting process to occur (such as, for example, the name of the insured, an address of the insured, etc.).

Prior to discussing features of some embodiments, an illustrative (but not limiting) example will be provided. This example will be referenced throughout the remainder of this specification to assist in describing features of some embodiments. In the illustrative example, an operator or administrator of a system pursuant to the present invention has identified (either automatically by operation of the system or otherwise) that certain types of information necessary for underwriting small commercial lines insurance policies may be reliably collected from certain types of data sources (including, for example, social media data sources). More particularly, the operator or administrator may have identified that certain types of restaurants may be accurately underwritten for small commercial lines insurance policies by proactively collecting information associated with the restaurant. The nature and type of the collected information may be identified based on a historical analysis of claims and loss data associated with similar restaurants.

In the illustrative example, the operator or administrator has determined that proactive underwriting may be performed for restaurants for small commercial lines insurance policies. For example, a restaurant may be proactively offered a policy based on data collected and aggregated using the system of the present invention, and/or a restaurant that requests a policy may not need provide the full application data typically required of a restaurant (as some portion of the data needed for underwriting may be collected and aggregated using the system of the present invention).

As a further specific illustrative (but not limiting) example, the system of the present invention may collect information required by a commercial lines policy "template" associated with a restaurant. For example, a commercial lines policy template for a restaurant may specify the data to be collected for proactive underwriting, including, for example, the type of restaurant (e.g., whether the restaurant provides table service, whether the restaurant provides table service with alcohol, etc.), the size of the restaurant (e.g., the estimated gross receipts, the square footage of the restaurant, the number of tables, or the like), features of the restaurant (e.g., whether the restaurant has one or more dance floors, whether the restaurant has video game machines, whether the restaurant is a sports bar, etc.). This information may be collected and aggregated from a number of different sources, including social media sources including Yelp.com, Google.com, Facebook.com, Instagr.am, or the like. These illustrative examples will be referenced throughout this disclosure to describe features of some embodiments of the present invention. Those skilled in the art, upon reading this disclosure, will appreciate that these examples are for illustration only, and that features of some embodiments may be used with desirable results when used in conjunction with other types of insurance (e.g., such as personal lines insurance, large commercial, or the like).

Further details, features and advantages of proactive underwriting pursuant to the present invention will become apparent upon reading the following detailed description. Features of some embodiments will now be described by first referring to FIG. 1, which is a block diagram of a processing platform 100 according to some embodiments of the present invention. The platform 100 may, for example, facilitate proactive underwriting using demographic, search, community, social and business network based data such as information published by individuals or businesses (e.g., via Twitter, Facebook, Google+, or the like), as well as information shared by individuals or businesses via searches, comments, postings, or the like.

Figure 1:
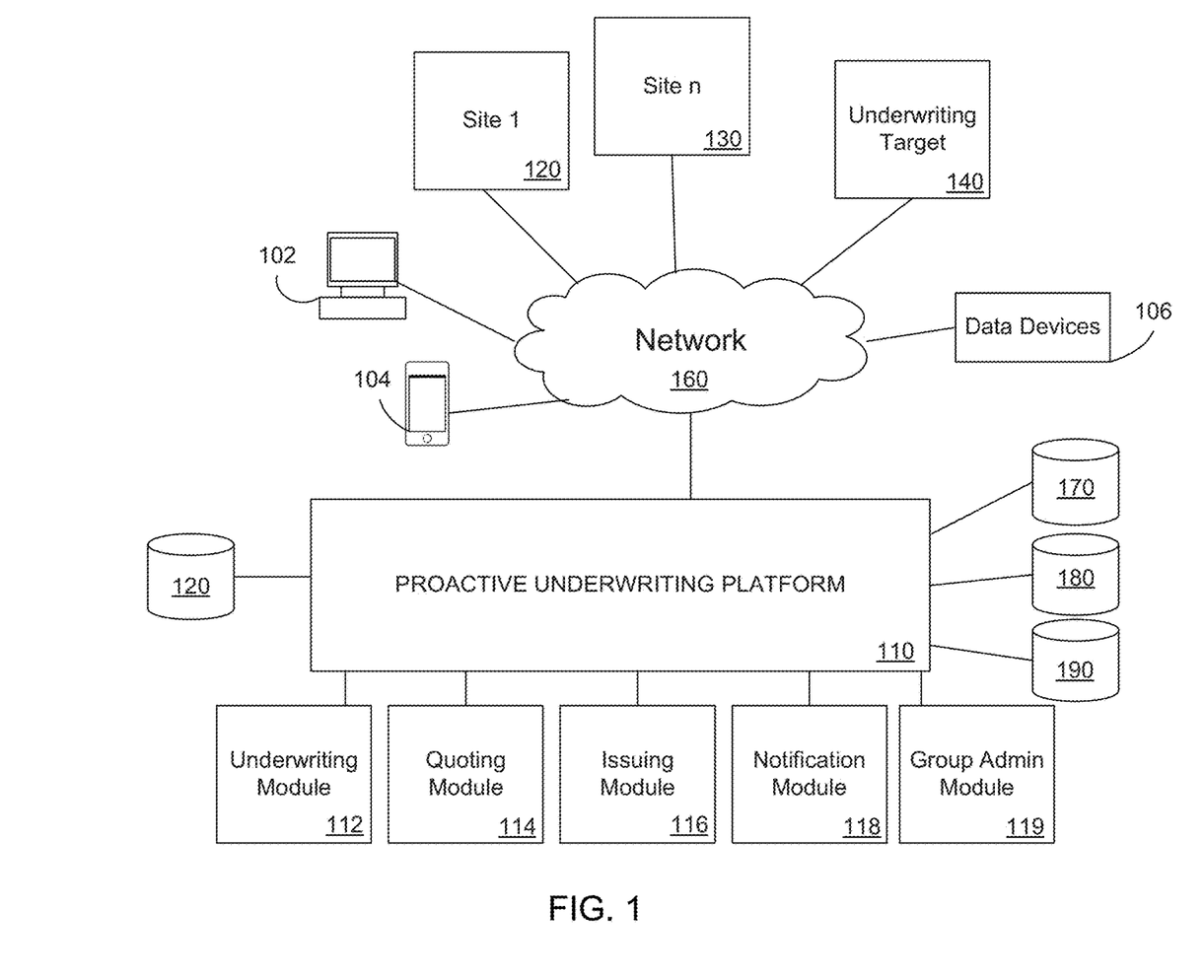
FIG. 1 is block diagram of a system according to some embodiments of the present invention.

For illustrative, but not limiting, purposes such information may be published by sites or networks including ebay.com, Facebook.com, LinkedIn.com, Twitter.com, Blogger.com, MySpace.com, Friendster.com, Google+, Youtube, Pinterest and other similar sites. Information may also be obtained from applications (such as those provided through the Apple® store, the Android® marketplace or the like) and devices (such as mobile phones, navigation systems, desktop computers or the like). Information may also be obtained from monitoring or telematics devices. For example, fitness and health data may be obtained from wireless-enabled scales (which measure and provide data regarding weight and body mass), wearable devices that measure data such as the number of calories expended, the number of steps walked, the quality of sleep, or the like. Such data may be obtained from one or more data repositories such as those provided by Fitbit® or the like. Any or all of these sources of data will be generally referred to herein as "social data" sources. For clarity and ease of exposition, individuals and businesses using features of the present invention to receive insurance services and information may generally be referred to herein as "consumers" or "individuals". In some embodiments, the term "entity" may be used to refer to an individual, consumer, business, business representative, or other entity that performs an action (such as makes a comment, updates a website, asks a question, updates a status, or the like) that triggers a proactive underwriting process. In some embodiments, the "entity" may be a prospective insured. In some embodiments, the "entity" may be an agent of a prospective insured, or a party somehow associated with a prospective insured.

As used herein, the term "rendering an underwriting decision" may be used to refer to providing a price quotation associated with an insurance product that has been evaluated using the present invention, providing a bindable quotation, providing an indicative quotation (which may require further information before it becomes bindable), or the like. As used herein, the term "communicating" an offer of insurance may be used to refer to providing a link to an insurance offer or quotation (such as a bindable or indicative quotation), providing a full offer (e.g., as an attachment to an email or as an email or item of postal mail), or otherwise communicating information to a prospective insured.

According to some embodiments, a proactive underwriting processing platform 110 may be provided for underwriting, evaluating, rating, offering, pricing or quoting insurance based on data from a variety of sources, including social network sites, operator entry, Websites, or the like. By way of example only, the proactive underwriting processing platform 110 may use data from such sources to both identify actions or trigger events that are associated with a request or need for insurance, as well as to collect data (pursuant to the relevant "template") needed to perform proactive underwriting for a particular offer of insurance.

In embodiments described herein, the proactive underwriting processing platform 110 may be operated to both identify activities, searches or other events that may trigger a proactive underwriting analysis, and to present an offer or information associated with a proactive underwriting analysis (e.g., such as a quote or offer of insurance) to a consumer or other entity. Pursuant to some embodiments, the proactive underwriting may be performed for a number of different types of insurance policies, including personal lines, workers compensation, health, group benefits, and other commercial policies. Pursuant to some embodiments, the processing platform 110 receives data from a wide variety of sources including one or more social media or other websites or properties 120-130 and devices 102, 104, 106. The data received are used to identify potential triggers or other events that cause a proactive underwriting process to be performed in association with a consumer or entity, and to retrieve the data needed for the underwriting process (pursuant to the relevant template). Further, the processing platform 110 may transmit data and notifications to consumers and insured individuals and businesses directly to devices 102, 104 or 106 or through one or more social media sites 120-130.

As used herein, devices including those associated with the proactive underwriting processing platform 110, and any other device described herein may exchange information via any communication network 160 which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Sites 120-130 may store, publish or otherwise provide access to information about consumers or other entities that may have insurance needs. For example, a consumer with a Facebook account may post status updates, information and comments to Facebook, and Facebook may publish or otherwise make the status updates, information or comments available to authorized individuals or entities. A new business may create a Facebook or Twitter account, or may launch a new Website for their business. Data associated with these events or activities may be used to identify triggers to initiate proactive underwriting processes pursuant to the present invention.

In some embodiments, one or more of the sites 120-130 may publish or otherwise disseminate the information via an application programming interface ("API"), an RSS feed, or some other structured format. The information may be analyzed or used by the proactive underwriting processing platform 110 on an individual item basis or on an aggregate basis with other information in order to: (i) identify trigger events indicating a request or need for insurance, and (ii) collect data (pursuant to a relevant template) needed to perform the proactive underwriting. Further the data may be combined with one or more other data sources, such as publicly available data provided by the U.S. Census Bureau or the like. Pursuant to some embodiments, data collected about individuals may be indexed to aggregate data across a wide variety of data sources as well as to de-identify any personally identifiable information. For example, a record about a consumer may include a non-personally identifiable identifier used to associate information about the consumer such as name, address, one or more social media user names, telephone numbers, email addresses, with information associated with characteristic data collected pursuant to the operation of the present invention.

As shown, the proactive underwriting processing platform 110 may include a number of modules or components, including one or more underwriting modules 112, quoting modules 114, issuing modules 116, notification modules 118 and group administration module 119. Proactive underwriting processing platform 110 may be deployed as a number of different platforms in communication with each other (for example, one processing platform may be deployed as a platform to identify trigger events by monitoring multiple data sources, while another may be deployed to perform underwriting analysis and data collection). Pursuant to the present invention, the notification modules 118 may be used to transmit information to eligible individuals, to service providers, and to other entities, including information relating to offers of insurance resulting from operation of the proactive underwriting platform of the present invention.

As will be described further below, the underwriting modules 112 may be used in conjunction with the creation and updating of one or more rating schedules for use in pricing and rating insurance policies or in creating insurance benefits or other offers in response to one or more trigger events pursuant to embodiments of the present invention. For example, in some embodiments, the underwriting modules 112 are used to analyze both conventional underwriting data such as historical loss information in conjunction with social and business network based data for use in rating and pricing business insurance policies.

Referring still to FIG. 1, the quoting and issuing modules 114 and 116 may be used in conjunction with the quoting, rating and pricing of insurance policies during proactive underwriting processing pursuant to the present invention. Note that the underwriting module 112, quoting module 114, and/or issuing module 116 may be associated with various types of insurance policies, including automobile and home insurance policies, for individuals and/or companies.

Although a single proactive underwriting processing platform 110 is shown in FIG. 1, any number of such devices may be included. Moreover, various devices described herein might be combined according to embodiments of the present invention. For example, in some embodiments, the proactive underwriting processing platform 110 and modules 112-119 might be co-located and/or may comprise a single apparatus.

The proactive underwriting processing platform 110 and the modules 112-119 may also access information in one or more databases 170, 180 and 190. The databases may include, for example, risk characteristic data 170, historical loss data 180 associated with previously-issued insurance policies, and policy data 190 associated with active policies. As will be described further below, the policy data 190 may be used to process information associated with trigger events related to requests to update an insurance policy or trigger events that may suggest that a policy change may be necessary or appropriate. That is, while in some embodiments (such as the illustrative example introduced above), the proactive underwriting process is performed for new customers of the insurance company, in some embodiments, the proactive underwriting process may be performed for existing customers of the insurance company (e.g., based on the identification of trigger data that indicates that an update or a change to an existing policy is needed or appropriate).

Figure 2:
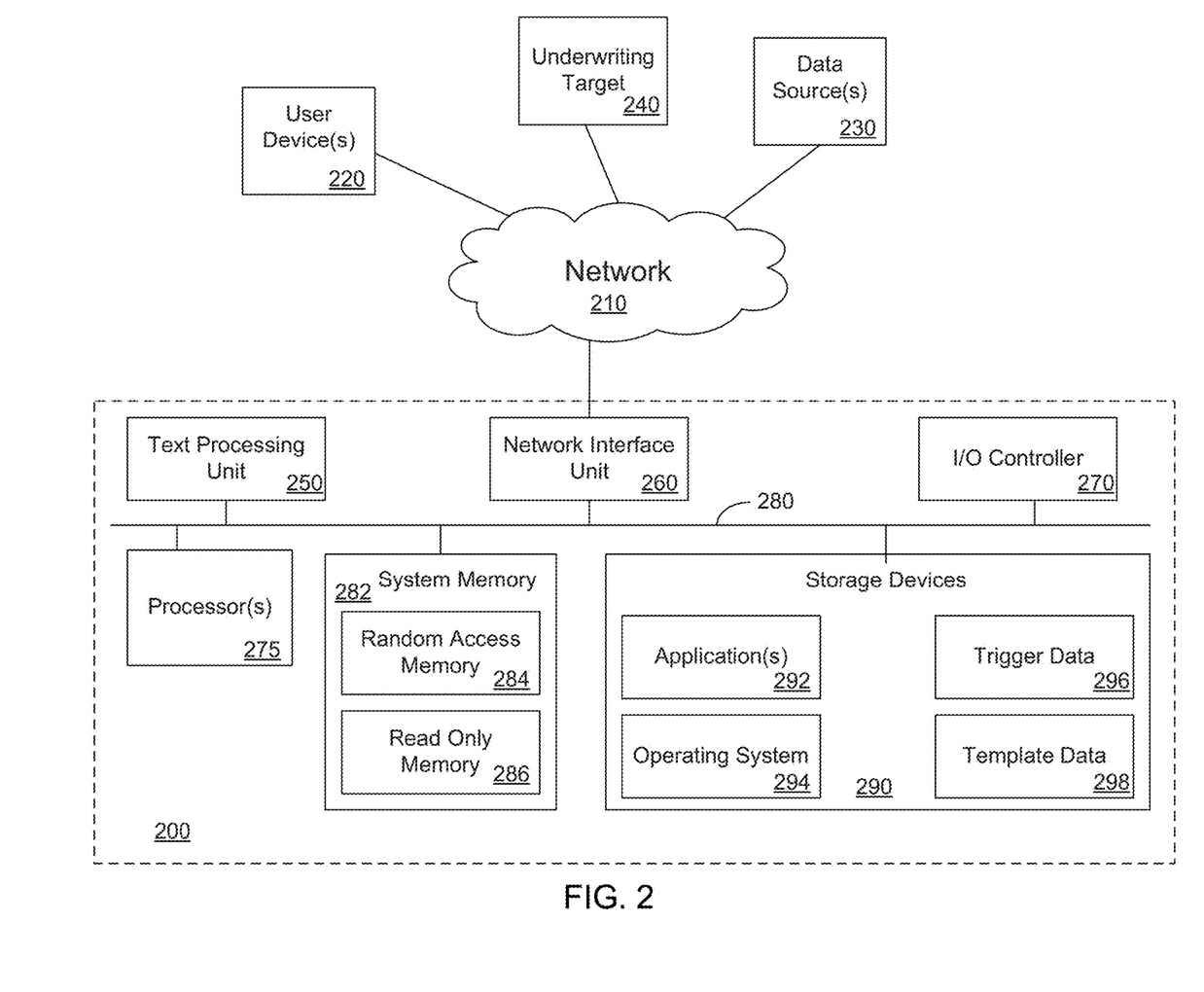
FIG. 2 is block diagram of a system according to some embodiments of the present invention.

Referring now to FIG. 2, one embodiment of the present invention is shown for proactive underwriting to provide targeted offers of insurance based on one or more identified triggers in social data or other data sources. As shown in FIG. 2, the proactive underwriting processing platform 200 communicates via network 210 to send data to, and receive data from, a plurality of user devices 220 (such as mobile phones, computers, or the like), a plurality of data sources 230 (such as social networking sites, public data sources, or the like), and one or more underwriting target(s) 240 to enable an insurance company to provide the underwriting target(s) 240 with offers of insurance that are proactively underwritten based on the identification of one or more trigger events.

Platform 200 also may include a number of devices or components, including computer processor(s) 275 and text processing units 250. The computer processor 275 and the text processing unit 250 may include one or more conventional microprocessors and may operate to execute programmed instructions to provide functionality as described herein. Among other functions, the computer processor 275 and/or the text processor 250 may access and retrieve information from data source(s) 230 via network interface unit 260 and input/output controller 270 via system bus 280.

Data identifying one or more sets of trigger rules and conditions may be stored in a data store 296. The trigger data may be specified by an insurance company or other entity to identify comments, actions, or other events that may trigger a particular type of proactive underwriting process. The trigger data may be applied to data monitored or analyzed from a variety of data sources, and may be formed as rules or conditions that must be met in order for a proactive underwriting process to be performed.

For example, in a mode of operation in which the proactive underwriting processor is operated to identify individuals or entities who may have a need for an insurance policy (either new or updated), the text processor 250 may be operated to scan existing forums, social media sites, and other web sites to analyze data to identify data that matches one or more trigger rules. The data analyzed may include forum posts, comments, Web blog posts, images, preferences (such as preferences or profile data associated with user accounts on sites such as Google+, Facebook, or the like), Twitter posts, etc. The text processor 250 may be programmed to identify different types of statements or comments that are relevant to one or more trigger rules.

The proactive underwriting processing platform 200 may further include a program memory 282 that is coupled to the computer processor 275. The program memory 282 may include a random access memory 284 and a read only memory 286. System memory 282 is further coupled via bus 280 to one or more fixed storage devices 290, such as one or more hard disk drives, flash memories, tape drives or other similar storage devices. Storage devices 290 may store one or more application programs 292, an operating system 294, and one or more databases such as a trigger database 296 for storing data identifying rules and conditions for a plurality of different triggers as well as a template database 298 for storing data defining the data to be collected to underwrite certain forms of insurance. Each trigger may be associated with one or more templates and each template may be associated with one or more triggers.

Platform 200 may be, according to some embodiments, accessible via a Graphical User Interface (GUI) rendered at least in part by input/output controller 270. The GUI might be used, for example, to dynamically display information associated with templates, triggers, triggers that have occurred, or the like.

Referring still to FIG. 2, the platform 200 performs processing to receive, process and extract relevant information from data source(s) 230 (such as social network data, search queries, blog comments, forum posts, etc.). The processing and extraction of information from the data source(s) 230 may take one or more of a number of different forms. For example, the processing platform 200 may monitor or search for activity associated with a number of triggers stored in trigger database 296. The triggers may be applied to data retrieved from data source(s) 230, or, in some embodiments, may be used to control queries of data source (s) 230 to identify data that match one or more triggers. For example, in the illustrative example introduced above, a set of trigger rules may be defined to attempt to identify restaurants that may need small commercial insurance policies. Those rules may include queries or search terms or conditions that must be met in order for the trigger to be satisfied. The search and processing of processing platform 200 may involve the use of natural language processing techniques to determine whether certain search, posting, or other activities of consumers or other entities contain, in substance, information that satisfies one or more triggers such that further proactive underwriting processing may be performed. Pursuant to some embodiments, the processing may including monitoring a plurality of social media data sources that may include monitoring a number of different social media websites (such as, for example, Twitter, Facebook, other websites, or the like). In some embodiments, the monitoring may include monitoring different webpages within a website (for example, different Facebook pages may be monitored for changes, such as a restaurant owner's personal Facebook page and the restaurant's official Facebook page).

Once a trigger has been satisfied, the processing platform 200 operates to collect data to satisfy the requirements of a template associated with the trigger, as described further below in conjunction with FIG. 4.

It is contemplated that the processing platform 200 may process data and information in one or more languages, such English, French, Arabic, Spanish, Chinese, German, Japanese and the like. In an exemplary embodiment, underwriting analysis by the platform 200 also can be employed for sophisticated text analyses, wherein text can be recognized irrespective of the text language. The relationships between the various words/phrases can be clarified by using an insurance rules engines for classifying words/phrases as a predictor of certain underwriting risk or as a predictor of intent or interest (e.g., to determine whether an individual or entity is interested in or needs an insurance proposal).

Figure 3:
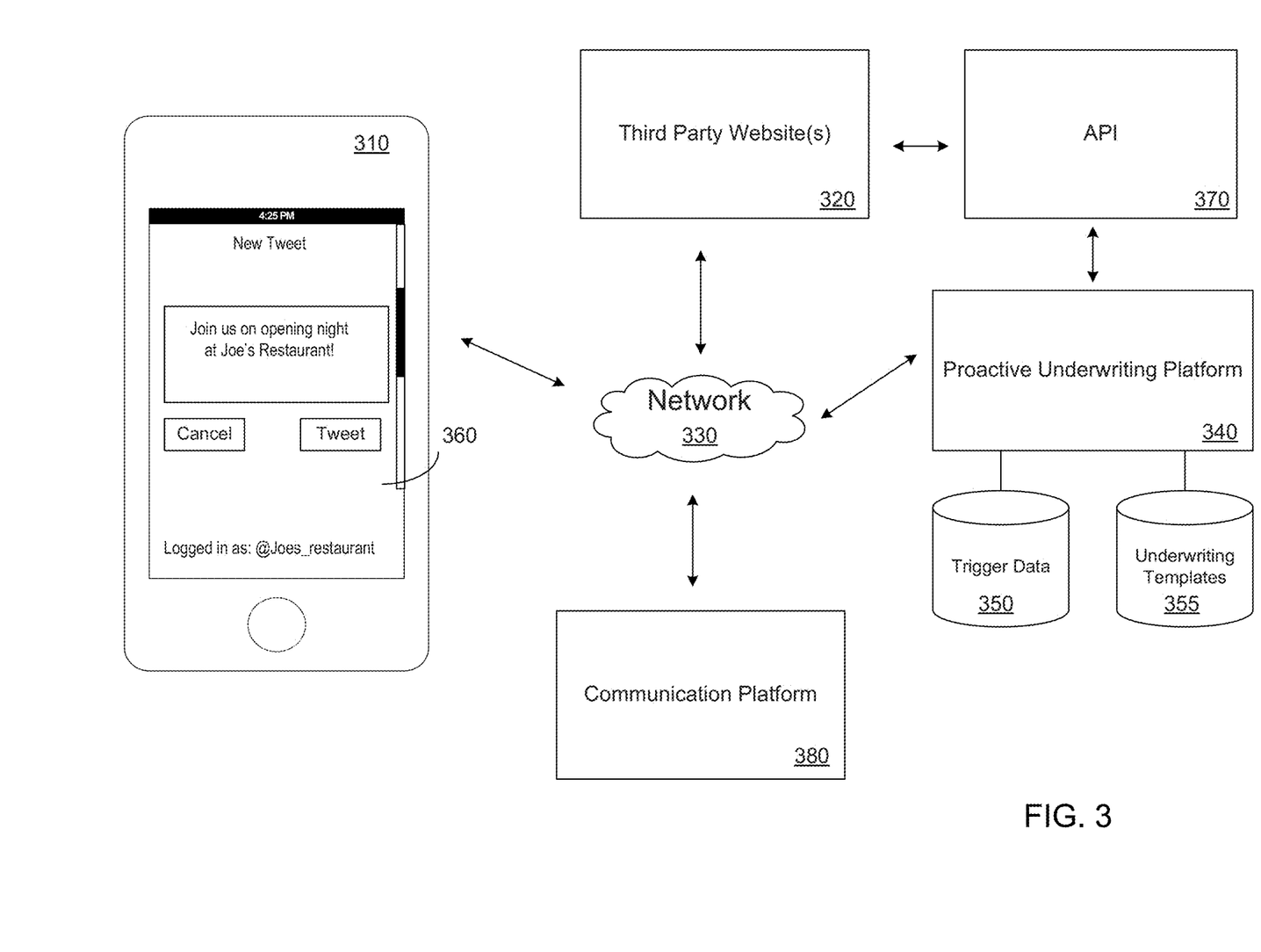
FIG. 3 is block diagram of a system according to some embodiments of the present invention.

Reference is now made to FIG. 3, in which an embodiment of a system 300 configured to identify a trigger event or set of events which cause a proactive underwriting process to be performed. As shown, system 300 includes a mobile device 310 operated by an individual such as an owner, operator, or other employee of an entity. The individual is shown operating the mobile device 310 to post a "tweet" on twitter.com using his Twitter account ("@Joes_restaurant"). The tweet is a message announcing that the individual is inviting followers or other readers to "Join us on opening night at Joe's Restaurant!", and sending the message will cause a website 320 (e.g., twitter.com) to post an update associated with Joes_restaurant's Twitter feed with the content of the message. Pursuant to some embodiments, Twitter feeds (as well as data from a variety of other sites and forums) are monitored by the proactive underwriting platform 340 to identify messages and posts which meet one or more trigger data 350 or rules associated with one or more underwriting templates 355.

The data from the site 320 may be received and parsed using one or more application programming interfaces ("APIs") 370 which allow data from a large number of different sites to be collected and monitored by the proactive underwriting platform 340. If the proactive underwriting platform 340 determines (upon processing the relevant underwriting templates) that an offer of insurance may be made, the offer may be communicated to the individual or entity via a communications platform 380. For example, the communications platform 380 may cause the offer to be communicated to the individual or entity via postal mail, via email, phone or as a message in a social network (such as a direct message via Twitter, or the like). In some embodiments, the communications platform 380 may cause the offer to be communicated to the individual or entity as a display ad or other message or offer online.

In the illustrative example introduced above, an insurance company or other entity operating the proactive underwriting platform 340 has determined that certain types of insurance may be underwritten or otherwise processed using the system of the present invention. More particularly, in the illustrative example, an insurance company has determined that certain forms of commercial lines insurance policies (such as those for certain classes of restaurants) may be underwritten using the proactive underwriting platform 340. The type and nature of the underwriting performed may vary for different types of businesses, and as a result, the insurance company has established one or more underwriting templates 355 which define the type and nature of information that is required to perform a proactive underwriting process for a particular entity. For example, an underwriting template 355 for a small restaurant may require different underwriting data than an underwriting template 355 for a large restaurant. Pursuant to some embodiments, information associated with each of a number of templates may be stored at or accessible to the proactive underwriting platform 340 for use in determining the type of information that must be obtained before a quote or policy may be fully underwritten.

Further, the trigger or characteristic data 350 stored at or accessible to proactive underwriting platform 340 may include a number of rules or conditions that must be satisfied before a proactive underwriting process is initiated. As an illustrative example, one trigger or characteristic rule may be designed to identify posts, comments, announcements, messages or other social data that may indicate that a restaurant in a given geographical region is opening. The rules may include natural language processing rules that are selected to reliably identify data that tends to indicate the opening of a restaurant. In some embodiments, the rules may also include geographical limitations (e.g., to identify potential restaurant openings in a geographical region in which insurance coverage by the insurance company is offered).

Individuals may create content and interact with third party websites using any of a number of different types of computing devices, including desktop computers, tablet computers, or mobile devices such as the mobile device 310. The mobile device 310 may be any of a number of different types of mobile devices that allow for wireless communication and that may be carried with or by a user. For example, in some embodiments, mobile device 310 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity such as a third party website 320.

Figure 4:
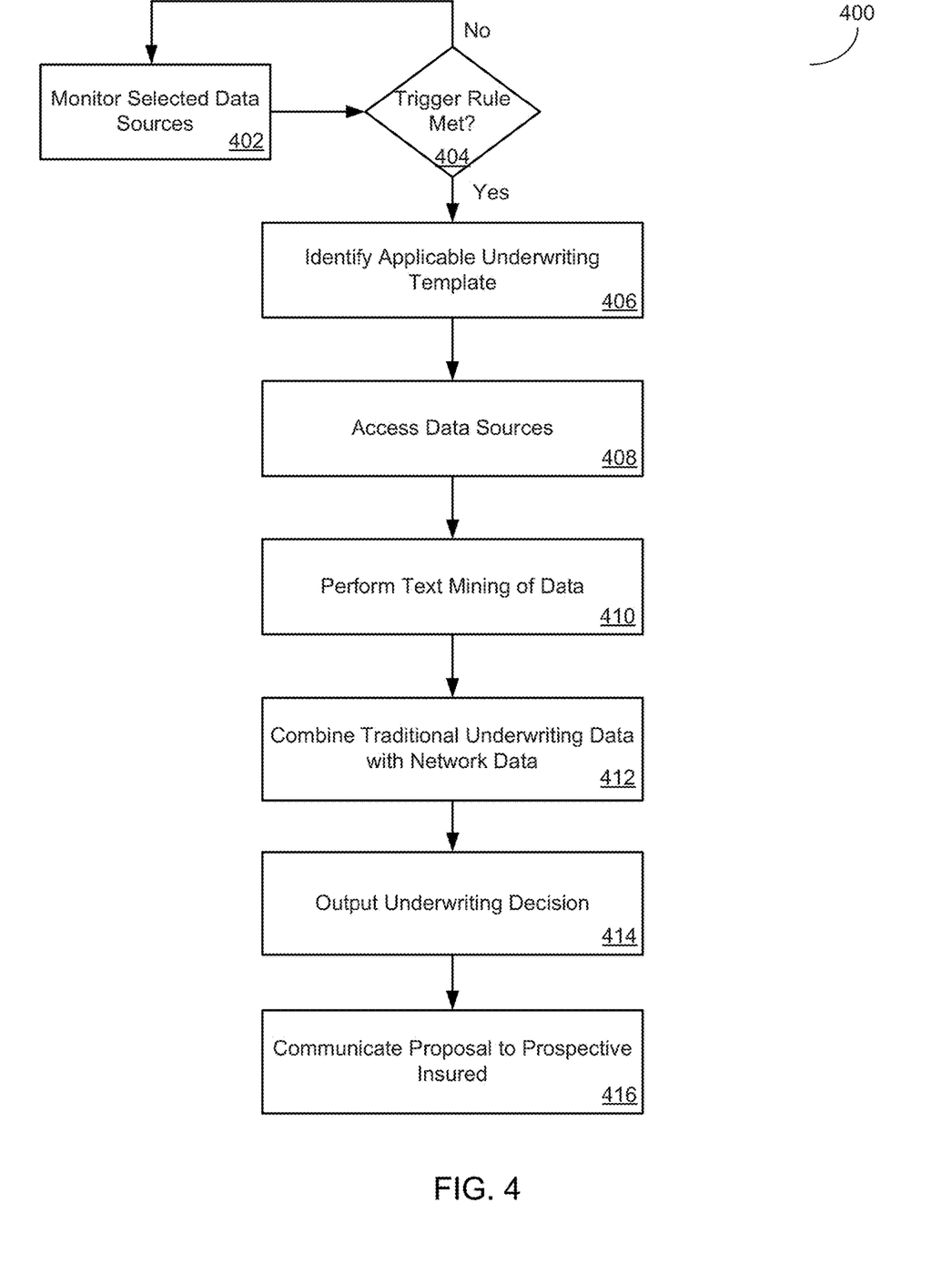
FIG. 4 is a flow diagram of a process according to some embodiments of the present invention.

FIG. 4 illustrates a method that might be performed, for example, by some or all of the components and elements of the proactive underwriting system described with respect to FIG. 1 or 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 400 may be performed in response to an action associated with an individual or entity to cause a proactive underwriting analysis to be performed such that, in some embodiments, an offer of insurance may be provided to the individual or entity. Pursuant to some embodiments, process 400 includes a step 402 of monitoring selected data sources. Processing at 402 may include operating one or more "listeners" or data collection routines to receive, process and extract relevant information from one or more data source(s) (such as the data source(s) 230 of FIG. 2). The data sources may include social network sites (such as Twitter.com, Facebook, Instagr.am, Flickr, blog comments, website changes, forum posts, or the like). The monitoring and extraction of information from the data source(s) 230 may take one or more of a number of different forms. For example, the proactive underwriting platform may monitor or search for activity associated with certain defined characteristics associated with one or more types of insurance, or one or more underwriting templates associated with particular types of insurance. The data sources monitored at 402 may be monitored in real time or in a batch basis.

Processing continues at 404 where the proactive underwriting system is operated to analyze the data from the monitored data sources to identify data that meets one or more trigger conditions. The trigger conditions may be established as rules that must be satisfied for a particular proactive underwriting analysis to be performed. For example, continuing the illustrative example introduced above, a trigger condition may be the identification of data that tends to signify that a new restaurant is being opened (or reopened) in a particular geographical area. The rules associated with the trigger condition may specify a particular geographical region, a particular type of restaurant, and possible additional factors (e.g., such as weighting factors that may be used to assess the likely credibility of a data source). Different data sources may have different trigger conditions or rules. For example, a restaurant review site (such as Yelp.com) that includes editorial data from professional editorial staff may be monitored to identify new restaurants (or restaurants that have been recently added to the data source). That is, in some embodiments, the trigger condition or rule may be the activity of a data source adding information about a particular individual or entity (such as the addition of a new restaurant to a review site).

Other trigger events or conditions may be the identification of certain keywords or other trigger language that have been correlated to indicate that a particular type of insurance may be desired or appropriate. Continuing the illustrative example, a trigger event or condition associated with identifying new restaurant openings or expansions (and related to the underwriting of a small commercial lines policy) may be satisfied by a Twitter message from a Twitter account of a restaurant that announces an "opening" or "expansion". As another example, a trigger event to identify a restaurant expansion may be satisfied by the posting of one or more pictures on an Instagr.am account with a tag or caption noting "Joe's Restaurant is expanding! Check out our new dance floor!"

Pursuant to some embodiments, multiple data sources may be required before a trigger condition or rule is satisfied to avoid errors or wasted efforts in performing the proactive underwriting of the present invention. Processing at 404 continues until a trigger rule has been met. In some embodiments, processing at 404 may be performed in multiple simultaneous processes to analyze multiple data sources for multiple trigger conditions.

Once a trigger condition has been identified as having been satisfied, processing continues at 406, where an applicable underwriting template is identified. For example, each trigger rule or condition may be associated with a relevant underwriting template. Continuing the illustrative example, the satisfaction of trigger conditions associated with a "restaurant" having an "opening" or "expansion" in Arizona may result in the identification of a specific small commercial lines underwriting template that was created for new or expanding restaurants in Arizona.

Each template may specify one or more items of data that are required to perform a proactive underwriting process for the associated type of insurance. For example, a template for a small commercial lines underwriting template for restaurants in Arizona may require that the following data be identified for use in proactive underwriting: the restaurant name, a type of the restaurant, a location of the restaurant (e.g., Address, City, State, and Zip), and a size of the restaurant. In some embodiments, the template may specify one or more additional items of data that should be collected if possible (but may not necessarily be required for the proactive underwriting process). For example, the following are non-limiting examples of optional data that may be collected: an estimate of the total receipts of the restaurant (which may be determined using comparable restaurant data for the geographic area), an estimate of the total liquor receipts of the restaurant, the estimated class or SIC code of the restaurant, the number of floors of the restaurant, the size of the restaurant, the number of gaming machines in the restaurant, or the like. Those skilled in the art, upon reading this disclosure, will appreciate that any number of data items may be required by a template, and any number of data items may be identified as optional for a template (the selection and requirements of the data for each template may be dictated by a modeling process or by other analysis of underwriting and claims data).

Process 400 continues with accessing data sources at 408. Data sources, such as the data sources 230 of FIG. 2, may be accessed, queried or otherwise analyzed to attempt to identify the data required by the underwriting template identified at 406. For example, in the illustrative example introduced above, a proactive underwriting process for a new restaurant is being performed, and the relevant underwriting template requires that data be collected which identifies the restaurant. Processing at 406 may include generating search queries to retrieve information from one or more data sources that can be used to identify the restaurant. Similar processing may be performed for each item of data required by the underwriting template being processed.

Process 400 continues at 410 with the performing of text mining of those data sources to obtain the information required by the underwriting template identified at 406. Process 400 continues at 412 with the combining of traditional underwriting data with the data obtained by text mining, and outputting an underwriting decision at 414.

In other embodiments, the social data may be used in conjunction with one or more predictive models to take into account a large number of underwriting parameters. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model (s) are trained on prior data and outcomes known to the insurance company. The specific data and outcomes analyzed vary depending on the desired functionality of the particular predictive model. The particular data parameters selected for analysis in the training process are determined by using regression analysis and/or other statistical techniques known in the art for identifying relevant variables in multivariable systems. The parameters can be selected from any of the structured data parameters stored in the present system, whether the parameters were input into the system originally in a structured format or whether they were extracted from previously unstructured text, such as from text based social data.

In some embodiments, the data collected and mined at 410 (and other steps herein) may be verified or validated. For example, if a name and address of a business is collected, other data sources may be consulted to verify or validate the actual business name. For example, business registration data sources may be consulted (such as data sources providing Secretary of State or other corporate records). In some embodiments, the verification or validation may be provided by a different entity than the prospective insured, while in some embodiments, the verification or validation may be performed by obtaining further data or information from the prospective insured. In some embodiments, additional information (such as traditional underwriting information) may be appended to or used in conjunction with the data collected from the data sources at 402.

Pursuant to some embodiments, if the underwriting decision at 414 is that an insurance offer may not be made given the data collected for the underwriting template, a further process may occur in which a traditional underwriting process is performed. For example, if the underwriting decision at 414 is not to underwrite, an underwriting referral may be done by the system automatically e-mailing or transmitting the tagged electronic application file to an underwriter for further review. If more than one underwriter is available to receive the referral of the file, then the computer system may automatically select the underwriter who is to receive the referral based on one or more factors such as one or more attributes of the insurance/applicant, the underwriter's qualifications and/or experience, the underwriter's current workload, etc. The underwriter's role, at this point, is to review the file, confirm that the referral is warranted, proceed with further analysis/investigation of the prospective insured, and then make an underwriting decision based on the additional underwriting performed which was triggered by the data collected pursuant to the underwriting template.

In embodiments where a trigger event or action has been identified, data has been collected for an appropriate underwriting template, and an underwriting decision has been received, processing may include notifying the prospective insured of the insurance proposal. Such notification may be performed by an email, direct message, mail, or telephone call in which details of the insurance offer are communicated to the prospective insured.

Figure 5:
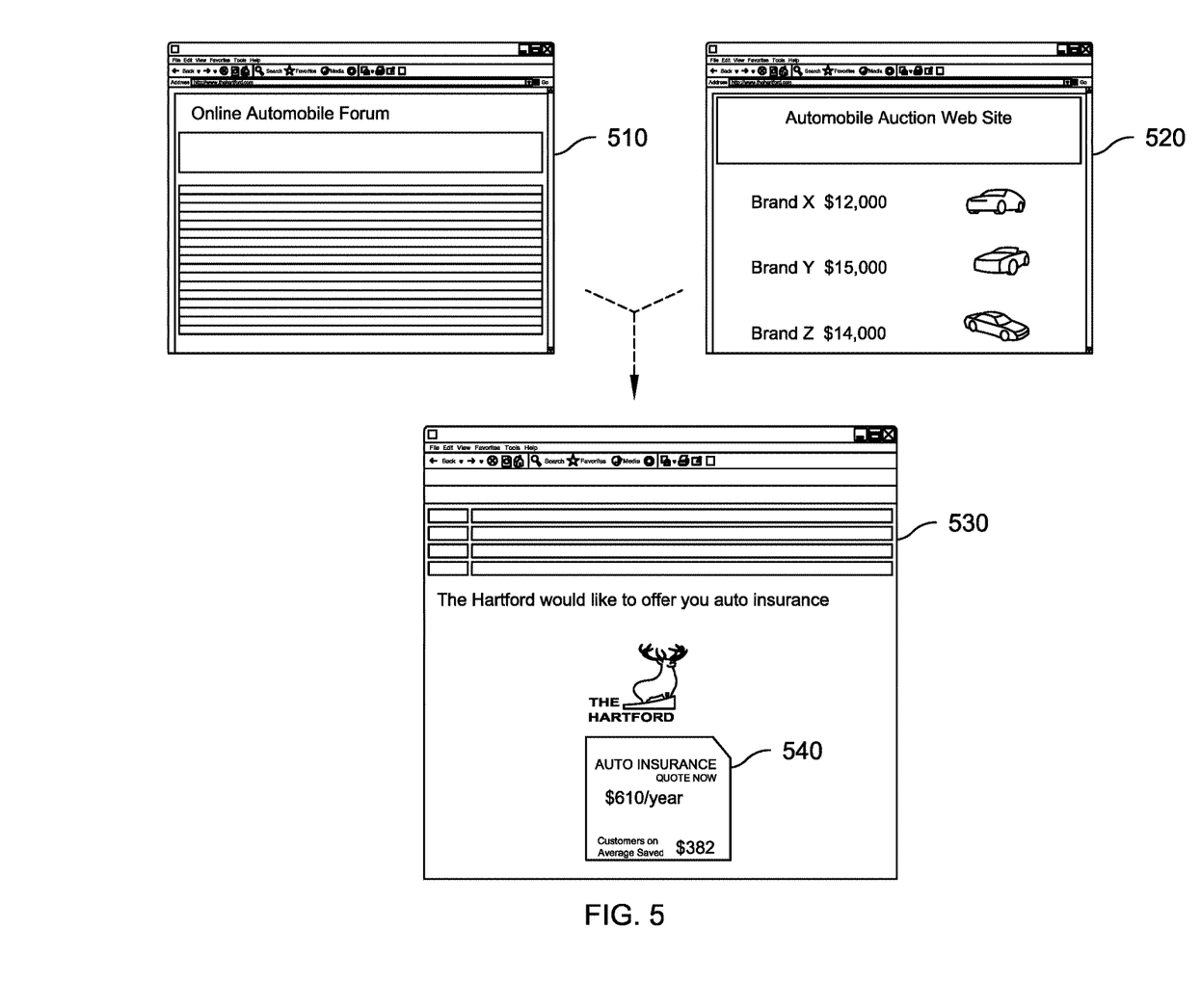
FIG. 5 is a diagram of some exemplary screen according to some embodiments of the present invention.

FIG. 5 illustrates some exemplary screens that may be used, displayed or provided, for example, by some or all of the components and elements of the proactive underwriting system described with respect to FIG. 1 or 2. The proactive underwriting processing platform 110, as shown in FIG. 1, may use data from such sources such as an online forum 510 and/or an auction site 520 to identify actions or trigger events that are associated with a request or need for insurance. Pursuant to some embodiments, the proactive underwriting may be performed for a number of different types of insurance policies, such as in this exemplary case, a personal lines automobile policy. The proactive underwriting processing platform 110, as shown in FIG. 1, may use data from either or both the online forum 510 associated with a particular type of automobile and the auction site 520 for the same automobile as a trigger event(s) that is associated with a need for insurance for that particular automobile and then notify a potential consumer or user with an insurance offer for such an automobile. Such notification may be performed using notification module 118, as shown in FIG. 1, by an electronic mail message 530 that contains an embedded insurance offer 540. A user may click or access the insurance offer 540 to bind the offer or access additional information related to the offer.

Figure 6:
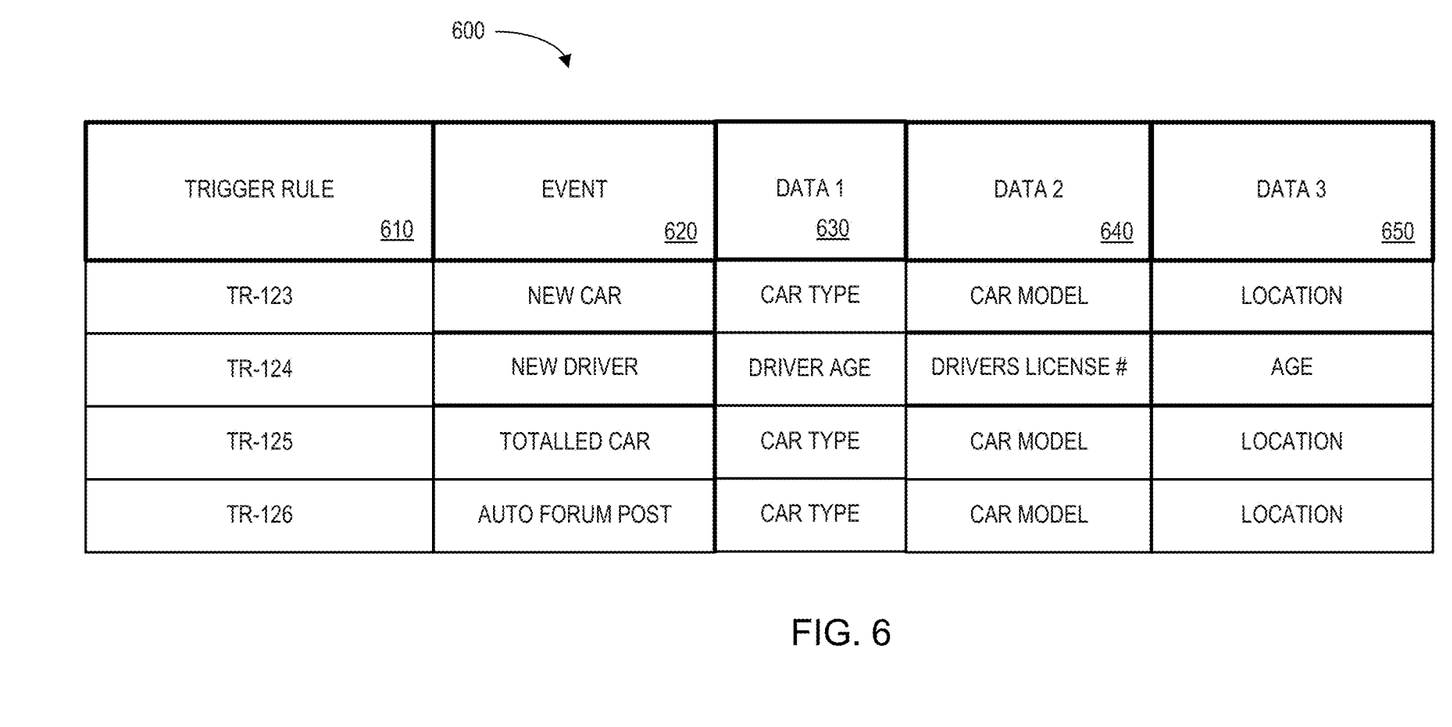
FIG. 6 is a diagram of a portion of an exemplary data storage table according to some embodiments of the present invention.

Referring to FIG. 6, a proactive underwriting table 600 is shown that may be stored in one or more databases 170, 180 and 190 as shown in FIG. 1. The table 600 may include, for example, entries identifying certain trigger rules and events and certain underwriting information associated with the rules and events. The table may also define fields 610, 620, 630, 640 and 650 for each of the entries. The fields 610, 620, 630, 640 and 650 may, according to some embodiments, specify: a trigger rule identification 610, a trigger event 620, a first underwriting data 630, a second underwriting data 640 and a third underwriting data 650. The information in the table 600 may be created and updated, for example, whenever data is analyzed and/or new interactions occur. Other trigger events or conditions may be the identification of certain keywords or other trigger language that have been correlated to indicate that a particular type of insurance may be desired or appropriate. The proactive underwriting system may specify one or more items of data that are required to perform a proactive underwriting process for the associated type of insurance. For example, the proactive underwriting system may require that, upon detection of a trigger rule TR-123 related to a "new car," the following data be identified for use in proactive underwriting: Car Type, Car Model and Location.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems). For example, some or all of the steps of the process of FIG. 4 may be performed using one or more processors or computer systems. For example, in some embodiments, a single processor or computer system may be programmed to perform all of the steps of a process. In some embodiments, different steps of a process may be performed using one or more different processors. As a result, as used herein, the term "by a processor" may refer to a single (or the same) processor or computer system, or it may refer to multiple (or different) processors or computer systems.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include Dynamic Random Access Memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or Electronically Erasable Programmable Read-Only Memory ("EEPROM"), a FLASH-EEPROM, any other memory chip or cartridge, or any other non-transitory medium from which a computer can read.

Various forms of computer readable media may be involved in carrying one or more sequences of one or more instructions to a processor (such as the processor 275 of FIG. 2, or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:
1. A computer implemented method, comprising:
continually monitoring, by a proactive coverage generation platform processor implementing a plurality of application program interfaces via a network interface unit connected to the Internet, a plurality of data sources including: RSS data feeds, and two or more of social data sources, entity web sites, forum web sites, blog web sites, auction web sites, or data repositories, to receive, process, and extract data relating to entities with potential coverage needs, wherein additional data received includes one of: biometric data from wearable devices or navigation data from telematics devices, and
analyzing the extracted data and identifying, by the proactive coverage generation platform processor based upon application of natural language processing, whether the extracted data includes data indicative of an action by an entity that matches at least a first trigger rule indicative of a coverage need, the action being unrelated to any risk mitigation policy, application for risk mitigation coverage, or activity by an agent that sells risk mitigation coverage, the first trigger rule comprising one of a plurality of trigger rules stored in a trigger database;
responsive to identification of the action that matches the at least first trigger rule, selecting, by the proactive coverage generation platform processor, one of a plurality of proactive coverage generation underwriting templates stored in a template database, said proactive coverage generation underwriting template being associated with said at least first trigger rule and defining a plurality of required data items for generating an underwriting determination;
accessing, by the proactive coverage generation platform processor via the network interface unit implementing the plurality of application program interfaces and without interaction with the entity, the plurality of data sources to obtain one or more of the plurality of required data items required in accordance with the template associated with the at least first trigger rule;
text mining, by the plurality of application program interfaces via the network interface unit, the plurality of data sources to obtain the one or more of the plurality of required data items required in accordance with the template associated with the at least first trigger rule and automatically collecting, by the proactive coverage generation platform processor, the one or more of the plurality of required data items required in accordance with the template associated with the at least first trigger rule;
performing, by the proactive coverage generation platform processor applying a predictive model trained to analyze relevant underwriting parameter variables in a multivariable system to said collected data, a proactive underwriting analysis, said proactive underwriting analysis being performed without a request from said entity to perform said underwriting analysis;

rendering, by an underwriting module, a quoting module, and a rating schedule database coupled to the proactive coverage generation platform processor, an underwriting determination comprising a price quotation for a risk mitigation product for the entity based on said proactive underwriting analysis;

generating, by a notification module coupled to the proactive coverage generation platform processor, an electronic communication including the price quotation for the risk mitigation product, the electronic communication comprising one of an electronic mail message and a social media network direct message; and transmitting, by the network interface unit to a user device corresponding to the entity, the electronic communication including the price quotation for the risk mitigation product.

2. The computer implemented method of claim 1, wherein the communication further includes an offer of insurance to said entity.

3. The computer implemented method of claim 1, wherein said action is at least one of (i) an Internet comment, (ii) an Internet status, (iii) an Internet action by said entity, (iv) a Webpage change, and (v) an Internet communication.

4. The computer implemented method of claim 3, wherein said action is associated with geographical data associated with a location of said entity, wherein said selecting a proactive coverage generation underwriting template further includes:
  selecting, by the proactive coverage generation platform processor, the proactive coverage generation underwriting template available for use in said location of said entity.

5. The computer implemented method of claim 3, wherein said at least first trigger rule is a rule identifying an insurable activity, and said selected proactive coverage generation underwriting template is a template for collecting data to perform an underwriting process for said insurable activity.

6. The computer implemented method of claim 1, wherein said electronic communication further comprises one of telephone, SMS messaging, and direct messaging.

7. The computer implemented method of claim 2, wherein said offer of insurance is a bindable offer of insurance.

8. The computer implemented method of claim 2, further comprising:
  receiving, by the proactive coverage generation platform processor, a response to said offer of insurance.

9. The computer implemented method of claim 8, further comprising:
  performing, by the proactive coverage generation platform processor, an updated underwriting process using data received in said response to said offer of insurance.

10. The computer implemented method of claim 1, further comprising:
  determining, by the proactive coverage generation platform processor, that at least a portion of said collected data requires verification; and
  verifying said at least portion of said collected data using a data source other than a source of the collected data.

11. A computer system comprising:
  a data storage device storing a plurality of proactive underwriting templates, each of said plurality of proactive underwriting templates being associated with at least a first trigger rule and defining a plurality of required data items for generating an underwriting determination; and a proactive underwriting platform processor configured to:
    continually monitoring, by a network interface unit by a plurality of application program interfaces connected to the Internet, a plurality of data sources including RSS data feeds and two or more of social data sources, entity web sites, forum web sites, blog web sites, or auction web sites, and receive, process, and extract data relating to entities with potential coverage needs;
    analyze the extracted data and identify, based upon application of natural language processing, whether the extracted data includes data indicative of an action by an entity associated with at least one of said plurality of social data sources that matches the at least first trigger rule indicative of a coverage need, the action being unrelated to any risk mitigation policy, application for risk mitigation coverage, or activity by an agent that sells risk mitigation coverage, the first trigger rule comprising one of a plurality of trigger rules stored in a trigger database;
    responsive to identification of the action that matches the at least first trigger rule, select one of the plurality of proactive underwriting templates stored in a template database, said one of the plurality of proactive underwriting templates being associated with said at least first trigger rule and defining a plurality of required data items for generating an underwriting determination;
    access, via the network interface unit implementing the plurality of application program interfaces and without interaction with the entity, the plurality of data sources to obtain one or more of the plurality of required data items required in accordance with the template associated with the at least first trigger rule;
    text mine, by the plurality of application program interfaces via the network interface unit, the plurality of data sources to obtain the one or more of the plurality of required data items required in accordance with the template associated with the at least first trigger rule and automatically collect the one or more of the plurality of required data items required in accordance with the template associated with the at least first trigger rule;
    perform, by a predictive model trained to analyze relevant underwriting parameter variables in a multivariable system, a proactive underwriting analysis using said collected data, said proactive underwriting analysis being performed without a request from said entity to perform said underwriting analysis; and
    render an underwriting module, a quoting module, and a rating schedule database coupled to an underwriting determination comprising a price quotation for a risk mitigation product for the entity based on said proactive underwriting analysis; and
    generate, by a notification module coupled to the proactive coverage generation platform processor, an electronic communication including the price quotation for the risk mitigation product, the electronic communication comprising one of an electronic mail message and a social media network direct message; and
    transmit, by the network interface unit to a user device corresponding to the entity, the electronic communication including the price quotation for the risk mitigation product.

12. The computer system of claim 11, wherein the proactive underwriting template further defines a plurality of optional data items, wherein the processor is further operative with the program instructions to:

automatically collect data associated with said plurality of optional data items.

13. The computer system of claim 11, wherein the electronic communication further comprises an offer of insurance to said entity based on said underwriting determination.

14. The computer system of claim 13, wherein said offer of insurance is a bindable offer of insurance.

15. The computer system of claim 11, wherein said at least first trigger rule is a rule identifying an insurable activity, and said selected proactive underwriting template is a template for collecting data to perform an underwriting process for said insurable activity.

16. The computer system of claim 11, wherein the underwriting determination is a determination to refer the underwriting analysis for further view, wherein the proactive underwriting platform processor is further operative with the program instructions to:

transmit an underwriting referral request to an underwriting group.

17. The computer system of claim 11, wherein said action is associated with geographical data associated with a location of said entity, wherein said proactive underwriting template is further selected based on said location of said entity.

* * * * *